June 24, 1947.                    G. HECHT                    2,422,655
                          TIME MEASURING SYSTEM
                    Filed Sept. 16, 1943        3 Sheets-Sheet 1

INVENTOR
G. HECHT
BY Franklin Mohr
ATTORNEY

FIG. 4

June 24, 1947.  G. HECHT  2,422,655
TIME MEASURING SYSTEM
Filed Sept. 16, 1943  3 Sheets-Sheet 3

RANGE ZERO
BEING MEASURED

RANGE 20000 YDS.
BEING MEASURED

RANGE 40000 YDS.
BEING MEASURED
MAXIMUM 80000 YDS.
BEING OBSERVED

INVENTOR
G. HECHT
BY Franklin Mohr
ATTORNEY

Patented June 24, 1947

2,422,655

UNITED STATES PATENT OFFICE 2,422,655

TIME MEASURING SYSTEM

George Hecht, Astoria, N. Y., assignor to Bell Telephone Laboratories, Incorporated, New York, N. Y., a corporation of New York Application September 16, 1943, Serial No. 502,619

4 Claims. (Cl. 161—15)

This invention relates to systems for measuring distances and time intervals by means of traveling waves and, more particularly, to devices for measuring the time interval between an outgoing pulse and a reflected pulse in terms of a voltage change in a resistance-capacitance circuit. Such a measuring device is commonly calibrated in terms of the distance traveled by a wave with a known velocity of propagation and may be used, for example, in determining the range of a target, in which case it is known in practice as an R. C. ranging unit.

While the invention may be used in many other organizations where time or distance measurements are required, the illustrative embodiments disclosed hereinafter are of the type known as radar systems, in which an electromagnetic wave is transmitted from a given point to a distant surface or object and a reflection is received at the first point, the distance of the object or surface being measured by the time required for the wave to travel to the remote point and for the reflection to return. In accordance with the invention, at the instant of sending out the traveling wave, a charging or discharging current is started in a resistance-capacitance circuit and employed to initiate a time sweep in a cathode-ray oscilloscope. The arrival of the reflected wave at the measuring station is utilized to produce a momentary deflection of the cathode ray in a direction perpendicular to the motion caused by the time sweep, thereby producing an indication or mark from which the distance to the remote point is determined by reference to an index stationary with respect to the screen of the oscilloscope and the setting of a potentiometer.

The invention is an improvement upon a time and distance measuring system disclosed and claimed by E. Bruce in his copending application Serial No. 499,211 filed August 19, 1943, and assigned to the assignee of the present application.

In common with the invention of Bruce, the present invention uses a resistance-capacitance sweep circuit of fixed time constant comprising a resistor of fixed total resistance value and a condenser of fixed capacitance.

Another common feature is the use of a null method whereby a precise setting of the potentiometer may be effected. The stationary index is caused to correspond to a condition of balanced voltages on the horizontal deflecting plates of the oscilloscope. By utilizing the balanced voltages in the setting of the indicator, it is possible to use relatively low charging voltages in the sweep circuit, combined with amplification to give relatively large deflecting voltages in the indicating device, without loss of accuracy. This becomes possible because departures of the amplifier from linearity in response to the charging voltages are of no consequence when two deflecting voltages are balanced to obtain a null reading.

A further common feature is a provision for expanding or magnifying any portion of the distance or range scale without restricting the total range observable in the indicating device.

The improvement that constitutes the present invention as distinguished from the invention disclosed and claimed by Bruce and which it is intended to claim in this application is characterized as follows:

(1) The variable potentiometer in the present invention is an integral part of the timing circuit, the total resistance of the potentiometer serving as a resistor of fixed resistance value in the timing circuit, and the variable contact of the potentiometer serving to select a potential at a point along the potentiometer.

(2) The transient current required for the timing function in the present invention flows through the variable potentiometer, during each time interval to be measured and consequently the potential at any intermediate point of the potentiometer varies as a function of time during the sweep.

(3) The initial current in the potentiometer of the present invention is the current which is switched into the condenser of the timing circuit, at the start of each time interval to be measured.

A further departure from the Bruce arrangement made possible by the present invention is the use of a single source of electromotive force or battery both for the timing circuit and for the deflecting amplifier, in place of the separate sources or batteries which are required in the Bruce arrangement.

Figure 1:
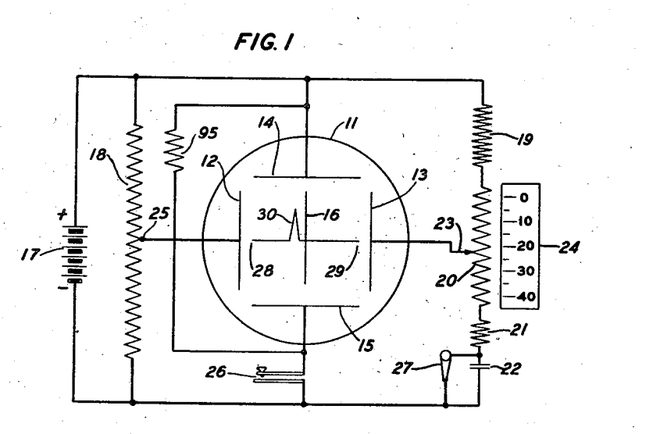
Figs. 1, 2 and 3 are diagrams useful in explaining the principle of operation of the sweep circuit and range potentiometer.

Referring to Fig. 1, a viewing screen 11 of a cathode-ray oscilloscope is shown schematically with a pair of plates 12 and 13 for horizontal deflection of the cathode ray and another pair of plates 14 and 15 for vertical deflection of the ray. A vertical index line or range mark 16 may be engraved or otherwise marked upon the screen, preferably at the position the cathode ray takes when plates 12 and 13 are at the same potential. Across the terminals of a source 17 of electromotive force, illustrated as a battery, there are connected a fixed potentiometer 18 and a sweep circuit in separate branches, the latter branch including a resistor 19, a variable potentiometer 20, a resistor 21 and a condenser 22. The potentiometer 20 has a movable contact arm 23 provided with a scale 24 adjacent thereto. The plate 12 is connected to an intermediate point 25 on the potentiometer 18 and the plate 13 is connected to the movable potentiometer arm 23. The plates 14 and 15 are connected together by a resistor 95 and individually connected to the respective terminals of the potentiometer 18, the connection from the plate 15 being normally broken by a momentary contact key 26. A switch 27 is provided to form a short circuit across the condenser 22 which may be opened when desired.

The arrangement shown in Fig. 1 may be employed in the following manner to measure a time interval. The beginning of the interval to be measured is to be marked by opening the switch 27, the interval continuing until its end is marked by a momentary closing of the contacts of the key 26. It is contemplated that the arrangement shown will be most useful where recurrent time intervals of equal or very nearly equal duration occur in rapid succession as is common in range measuring systems.

The manner of operation of the arrangement of Fig. 1 is as follows. In the normal condition of the circuit, with the switch 27 closed, the condenser 22 is in a state of discharge. Upon opening the switch 27, the condenser 22 begins to charge with current from the source 17. As the charging proceeds, the potential of each point of the resistors 19 and 21 and of the potentiometer 20 will gradually increase from whatever value of potential the respective point has when the switch is closed. If permitted to charge until the condenser attains the full potential of the source 17, all points in the resistance portion of the timing circuit would attain the full potential of the source. The values of the resistances of the timing circuit elements are to be so chosen that with the potentiometer arm 23 set at the uppermost end of the potentiometer 20, that is at zero on the scale 24, the potential of the arm 23 with the switch 27 closed will be equal to the potential of the point 25 in the potentiometer 18. Under this initial condition, the cathode ray of the oscilloscope will be at the center of the screen. When the arm 23 is set at maximum range and the switch 27 is closed, the cathode ray should be at the extreme edge of the screen, preferably at the left side as at 28 in the figure, the upper terminal of the source 17 being positive. When the switch 27 is opened, the rising potential of the potentiometer arm 23 will eventually attain the potential of the point 25 and thereafter rise above that potential. At the instant when the arm 23 is at the same potential as the point 25 the cathode ray will again be at the center of the scale.

Provided that the closing of the key 26 marking the end of the interval to be measured occurs before the cathode ray has completed its sweep across the screen at 29, a mark 30 will be produced on the screen at the instant of closing of the key 26, due to vertical deflection of the cathode ray in known manner. A time measurement is made by moving the arm 23 along the potentiometer 20 to bring the mark 30 precisely at the range mark 16, a process which becomes entirely feasible if the mark 30 appears repeatedly.

It is evident that not only the starting point of the cathode ray sweep but also the position of a mark such as 30 will change with the setting of the arm 23, i. e., with the reading of the scale 24. If the mark 30 occurs to the left of the center line 16, it is an indication that the arm 23 has been set to too large a reading and should be moved upward as shown in Fig. 1. When this change in setting has been made, if the interval to be measured has not greatly changed meanwhile, the beginning of the next sweep of the cathode ray and likewise the location of the mark 30 will appear further to the right than before and may be brought closer to the center by continued adjustment. If, on the other hand, the mark 30 is first observed to the right of the index 16, the arm 23 should be moved to a lower position in Fig. 1, thereby causing the next sweep of the cathode ray to start a little farther to the left, bringing the mark 30 also over toward the left. When the mark 30 coincides with the range mark 16, the reading of the scale 24 will show the true measurement of the time interval. The scale 24 may be calibrated against known time intervals in any convenient manner. After each operation of the key 26, it is necessary to close the switch 27 thereby discharging the condenser 22 before beginning the next time interval to be measured. As is well known, the various keying operations that have been described may be performed by automatic means.

The capacitance of the condenser 22 is preferably made large in order that stray changes in the capacitance of the timing circuit will not appreciably affect the accuracy of measurements.

Figure 2:
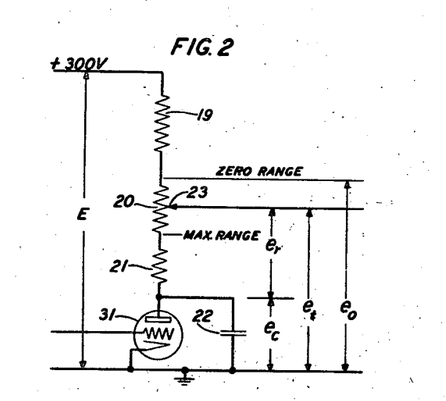
Figure 3:
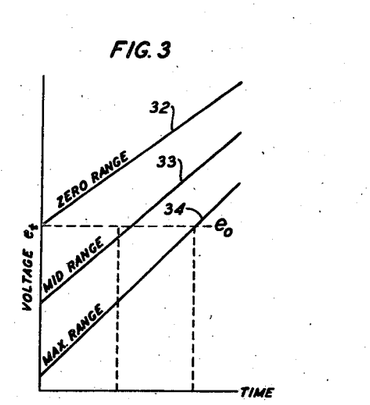

The potentials at the various positions of the potentiometer arm 23 and the rises which occur during the charging period are more readily appreciated by reference to Figs. 2 and 3. In Fig. 2 the full potential of the source 17 is represented by $E$. The potential of the point 25 in the potentiometer 18 is indicated for reference by $e_0$. In Fig. 2, the switch 27 has been replaced by a vacuum tube 31, the plate circuit of which may be controlled in well-known manner by means of a grid potential to make the tube operate either as an open circuit or as a substantial short circuit, as desired. The voltage across the tube 31 and condenser 22 is represented by $e_c$ and the potential of the point 23 is represented by $e_t$, which latter is made up of $e_c$ plus the potential $e_r$ between the upper plate of the condenser 22 and the arm 23. In Fig. 3 the voltage $e_t$ is plotted as a function of the time during the charging of the condenser 22. The charging curves are shown for three settings of the arm 23. The curve 32 is for the zero range, that is, with the arm 23 set at zero. The curve 33 is for midrange and the curve 34 for maximum range. The three curves 32, 33 and 34 are parts of exponential curves which appear substantially straight at the start. They converge slightly as time goes on, finally approaching one and the same value, namely $E$, well beyond the limits of the drawing of Fig. 3. In order to operate on the nearly linear portion of the charging curve, it is advisable to use only a small percentage of the total voltage rise. In other words, $e_0$ should be small compared with E, in some cases perhaps no more than approximately 2 per cent of the voltage of the source. Other means for avoiding the deleterious effects of the non-linearity are disclosed and claimed in the above cited Bruce application. It will be noted that the curve 32 for zero range starts in at the voltage $e_0$ while the curve 34 for maximum range attains the value $e_0$ at a later time. Any intermediate setting of the arm 23 results in a charging curve which starts at an intermediate voltage and reaches the value $e_0$ at an intermediate time. It will be noted that the intersection of the particular charging curve in Fig. 3 with the horizontal line marking the voltage $e_0$ determines the time at which the cathode ray reaches the index range mark 16.

The same general principles may be applied to construct a system in which a discharging current is used instead of a charging current and in which falling potentials are used instead of rising potentials.

Figure 4:
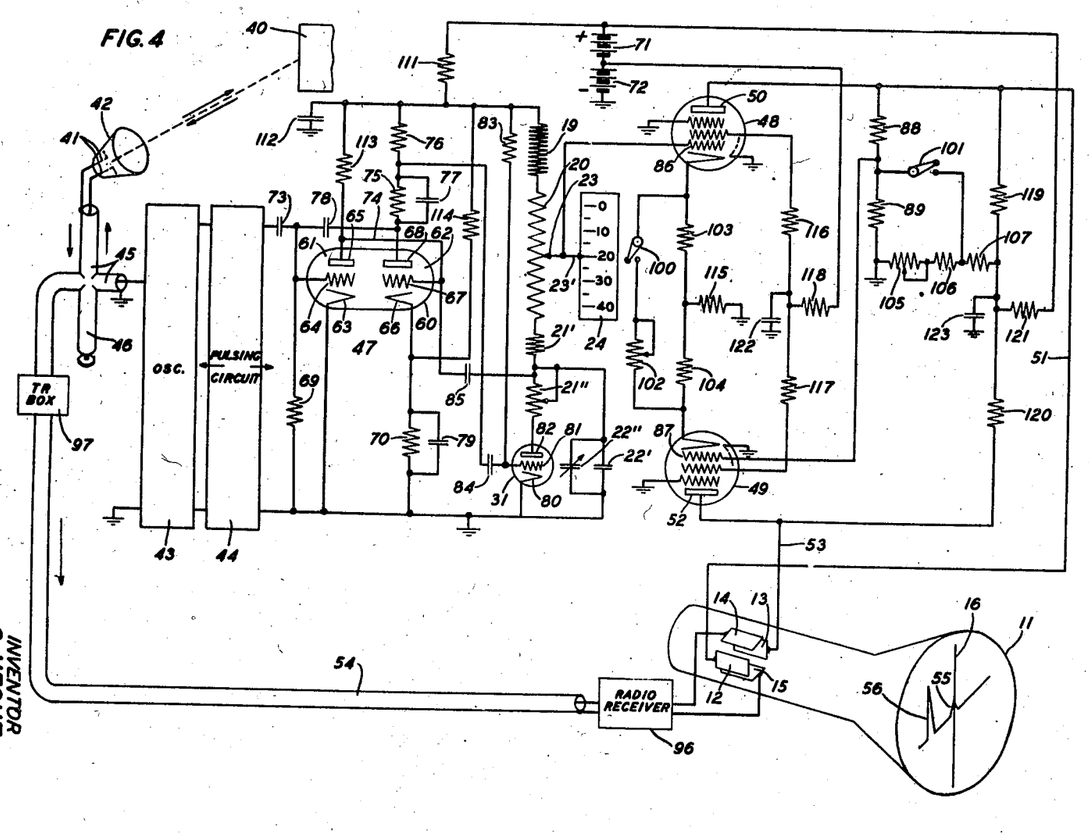
Fig. 4 is a schematic representation of a radar system embodying the invention.

Fig. 4 shows an embodiment of the measuring system of the invention in a radar system. The object, the distance of which is to be measured is represented at 40. At the measuring station there are provided projecting and receiving means for electromagnetic waves which means may take the form of a dipole antenna 41 mounted at the focus of a paraboloidal reflector 42 with suitable means (not shown) for directing the axis of the reflector toward the object 40. The antenna 41 may, if desired, serve both for transmitting and receiving as illustrated, or separate transmitting and receiving devices arranged for simultaneous pointing toward the object may be used, or a non-directional transmitting antenna may be employed with a directional receiver (or vice versa).

The waves to be projected are generated by an oscillator 43 which may be of any known variety, preferably an ultra-high frequency generator of some kind. The oscillator 43 is controlled by a pulsing circuit 44 of any suitable kind and the output of the oscillator is connected to the antenna 41 by a transmission line system 45 which may be of the usual coaxial type and which may be provided with a tuning stub 46.

The pulsing circuit 44 may also serve to control the starting and stopping of the charging current in the sweep circuit, preferably through the intermediary of a start-stop circuit indicated generally at 47.

The start-stop circuit 47 may be directly connected to the sweep circuit the elements of which latter are shown substantially as in Figs. 1 and 2 and are correspondingly numbered. Minor variations are indicated by primed reference numerals. For example, the resistor 21 is replaced by a resistor 21' and a rheostat 21'' has been inserted in series with the anode of the tube 31. The condenser 22 is replaced by a fixed condenser 22' connected in parallel with a variable condenser 22'', and the potentiometer arm 23 is provided with an index 23' movable with the arm 23 along the scale 24. The resistor 19 and the potentiometer 20 are the same as in Fig. 1.

In place of the direct connection from the timing circuit to the horizontal deflecting plates of the oscilloscope these connections are made through the intermediary of a pair of vacuum tubes 48 and 49 each of which may contain a cathode, an anode, a control grid, a screen grid and one or more additional electrodes, as desired, adapted to suppress secondary electron emission, form the electron stream into a concentrated beam, or for other functions. The oscilloscope screen 11 is shown in Fig. 4 and corresponds to the similarly numbered screen in Fig. 1. The deflecting plates 12, 13, 14, and 15 are represented in perspective view and the vertical center index 16 is shown on the screen 11.

The tube 48 has its anode 50 connected to the oscilloscope deflecting plate 12 through a lead 51 and the tube 49 has its anode 52 connected to the deflecting plate 13 through a lead 53. The vertical deflection plates 14 and 15 are connected respectively to the output terminals of a radio receiver 96, the input terminals of which are connected to the conductors of a branch transmission line 54 which may be connected with the antenna 41 through a protective device 97, illustrated as a TR box, and the transmission line 45. The function of the TR box, which is well known, is to transmit relatively weak waves from the antenna 41 to the radio receiver 96 but to establish a substantial short circuit when a relatively strong wave from the oscillator 43 is impressed, thereby protecting the radio receiver from the force of strong locally produced waves while permitting reception of reflected waves.

*Operation*

The general scheme of operation of the system of Fig. 4 is as follows. The pulsing circuit 44 serves to render the oscillator 43 normally disabled but periodically energizes the oscillator to permit a short train of oscillations to be generated. Pulsing circuits and their operation are well known to those skilled in the art and are believed to require no detailed description herein. The train of oscillations is transmitted from the oscillator 43 through the transmission line 45 to energize the antenna 41 whereby an electromagnetic pulse is projected by the projector 42. The pulse is preferably of only a few microseconds duration or less and the separate pulses are preferably emitted at such intervals that an emitted pulse may travel to the most distant object to be tested and return to the projector, leaving time for discharging the condenser in the sweep circuit before the succeeding pulse is sent out. The intervals between pulses do not, however, need to be of uniform length. The returning pulse, produced by scattered radiation or reflection from the object 40 will be received in the projector 42 and will energize the antenna 41. The received wave in the antenna is transmitted through the TR box 97 and the line 54 to the radio receiver 96 to energize the vertical deflecting plates 14 and 15 of the oscilloscope and produce a mark such as shown at 55 representing the incoming pulse.

As it may be desirable also to represent the outgoing pulse on the screen of the oscilloscope, a suitable amount of direct transmission may be arranged between the lines 45 and 54 through the TR box 97 or otherwise to permit the outgoing pulse to be transmitted to the radio receiver as well as to the antenna 41, and in this case the outgoing pulse will make a mark such as shown at 56, appearing to the left of the mark 55. The spacing between corresponding parts of the marks 55 and 56 due to the action of the sweep circuit and the amplifying tubes 48 and 49 is a measure of the distance of the object 40 from the antenna 41. The position of the marks 55 and 56 with respect to the index line 16 may be adjusted by moving the potentiometer arm 23 similarly, except for details introduced by the amplifiers as has been described above in connection with Figs. 1 and 2.

The start-stop circuit, the sweep control circuit and the horizontal deflection amplifier will now be described in more detail.

*Start-stop circuit*

The start-stop circuit 47 includes two vacuum tube triodes which may, if desired, be enclosed in a single envelope 60. The triodes are interconnected to operate as what is commonly called a single-pulse multivibrator. The left-hand triode, designated 61 is, in the absence of an input from the pulsing circuit 44, normally conducting. The right-hand triode, designated 62, on the other hand, is normally not conducting. The triode 61 comprises a cathode 63, a grid 64, and an anode 65, and the triode 62 has corresponding elements 66, 67 and 68.

A divided battery comprising sections 71 and 72 constitutes the anode and screen grid supply source for the various vacuum tubes in the system as well as the source of potential for charging the sweep circuit and for deflecting the cathode ray.

A resistor 111 and a condenser 112 may form an anode supply filter for the tubes 31 and 60, and a resistor 121 and condenser 123 an anode supply filter for the tubes 48 and 49. A resistor 118 and condenser 122 may form a screen grid supply filter for the tubes 48 and 49. The screen grid circuits of the tubes 48 and 49 may include small resistors 116 and 117, respectively to suppress spurious high frequency oscillations. The anode circuits may include load resistors 119 and 120, respectively.

The triode 61 has its grid 64 normally at the potential of the cathode 63 by connection through a resistor 69 and the triode conducts anode current through an anode resistor 113. The triode 62 is normally blocked by having its grid 67 biased to anode current cut-off by a negative potential drop in a cathode resistor 70 due to a current from the anode supply through a resistor 114, the anode 68 being at approximately the potential of the positive terminal of the battery 71. The resistor 70 may be shunted by a condenser 79.

The pulsing circuit 44 is preferably arranged to furnish a negative pulse to the grid 64 through a coupling condenser 73. When the pulse is applied, a potential drop is impressed upon the resistor 69, the triode 61 thereby being driven abruptly to anode current cut-off. This causes the potential of the anode 65 to rise rapidly in the positive direction, approaching the full supply voltage, and the grid 67 of the triode 62 is carried along with the anode 65 to a positive potential by the action of an interconnecting lead 74. Anode current immediately starts to flow in the triode 62, passing through a pair of resistors 75 and 76, and charging the condenser 79 and a condenser 77, the latter connected in parallel with the resistor 75. The potential drop in the resistors causes the anode 68 to become less positive, approaching the potential of the cathode 66. A condenser 78 is provided as a coupling between the anode 68 of triode 62 and the grid 64 of triode 61, and is normally charged to approximately the supply voltage. When the potential of the anode 68 is lowered, the condenser 78 starts to discharge through the resistor 69 and through the anode-cathode internal resistance of the triode 62. During the discharge time of the condenser 78 the grid 64 is held below cut-off, the charge on the condenser 78 replacing in the resistor 69 the energizing pulse from circuit 44 which pulse meanwhile has ceased. When the condenser 78 ceases to discharge, the current through the resistor 69 stops, the grid 64 has returned to a potential above the anode current cut-off and the triode 61 conducts again. This brings the grid 67 back down below anode current cut-off of triode 62, whereupon the potential of the anode 68 rises again toward the full supply voltage and the condenser 78 is recharged rapidly through the resistors 75 and 76 and the low grid-cathode resistance of the triode 61, shunting the resistor 69, which results from the positive potential on grid 64. At the same time the condenser 77 is discharged and condenser 79 is partially discharged. When this cycle of operations has been completed the circuit is ready to receive the succeeding pulse from circuit 44. The time interval from the receipt of a pulse from circuit 44 to the completion of the recovery of circuit 47, which interval limits the total maximum sweep time and hence the maximum range of the system, may be varied by adjusting the capacity of the condenser 78 or the resistance of the resistor 69 or both. For proper operation, the minimum interval between pulses will exceed the maximum sweep time by a sufficient margin to allow the recovery to take place.

*Sweep control*

The function of the start-stop circuit 47 in controlling the charge and discharge of the timing elements of the sweep circuit will next be described.

The switching tube 31, which is normally in the conducting condition, may be a triode having a cathode 80, a control grid 81 and an anode 82. The normal conducting condition of the tube 31 is attained by connecting the grid 81 to the positive side of the supply battery through a resistor 83, preferably adjusted to permit a small amount of grid current to flow between the grid 81 and the cathode 80. With a low anode current, obtained by making the resistor 19 a high resistance, the potential of the anode 82 is readily made to be within a few tenths of a volt of that of the cathode 80. Consequently, the charge on the condensers 22' and 22" is normally practically zero. However, the accuracy of measurements with the system requires only that the initial voltage on the timing condensers be a stable one, a zero value is not essential.

The grid 81 is coupled through a condenser 84 to the junction of the resistors 75 and 76 in the anode circuit of the triode 62 of the start-stop system. When the triode 62 is made conducting as above described and the potential of its anode falls, there is a resulting sudden surge of current between the grid 81 and the cathode 80 externally of the tube 31 through resistor 75, through the lowered anode-cathode resistance of the triode 62 and through resistor 70. This current is in such a direction as to overcome the effect of the grid current flowing to the grid 81 of the tube 31 from the battery through the resistor 83 and carries this tube immediately below cut-off. The anode 82 then begins to rise in potential with the result that the condensers 22' and 22" begin to charge through the resistive timing elements 19, 20 and 21' and the potential across the timing condensers rises exponentially. Furthermore, the potential of each point on the potentiometer 20 also rises exponentially, as explained above in connection with Figs. 1 and 2.

The potentials of the timing circuit continue to rise until, with the recovery of the start-stop circuit, the potential of the anode 68 of triode 62 becomes rapidly more positive again. Thereupon the condenser 84 recharges through the resistor 76 and the grid-cathode resistance of tube 31 and the grid 81 of the tube rises in potential until the tube is suddenly made conducting again. This action is aided by the flow of grid current to grid 81 through the resistor 83. The charging of the condensers 22' and 22'' through the timing resistors is thereby abruptly stopped and the condensers discharge through the rheostat 21'', which is preferably of low resistance, and through the now low anode-cathode impedance of the tube 31. When the discharge has been completed, the timing circuit becomes inactive and remains so until another pulse is received from the circuit 44 to actuate the circuit 47 and repeat the above-described cycle.

A condenser 85 may be connected as shown in Fig. 4 for the purpose of neutralizing the effect of the grid-anode capacity of the tube 31 at the beginning of the timing cycle. It is found that when the start-stop triode 62 is first energized, the negative surge on the grid 81 of tube 31 is so sharp that it tends to pull the anode negative along with the grid. The result of this is to slow up the rise of the anode potential of the tube 31 during the first few microseconds. It has also been found that by applying a positive pulse by way of the condenser 85 from the grid 67 of triode 62 to the anode 82 of tube 31 at the same instant as the grid of the tube 31 is going negative, the anode potential is permitted to rise without delay. In fact, by increasing this positive pulse (by increasing the capacity of the condenser 85) the timing potential rise can actually be speeded up at the beginning to counterbalance any small delay which may occur in the deflection amplifiers 48 and 49. The result is that the cathode-ray sweeps across the screen at a substantially constant rate beginning almost immediately upon the receipt of the starting pulse, the only residual delay being in the start-stop circuit, which latter delay has been found to be less than one microsecond in a representative case. It is also feasible to avoid the residual delay in a start-stop circuit by eliminating the start-stop circuit and connecting the pulsing circuit directly to the sweep circuit.

The neutralizing condenser 85 also aids in the recovery of the timing circuit by delivering a negative pulse to the plate 82, tending to pull its potential down, at the same time that the grid 81 is being drawn above plate current cut-off by a positive pulse through the condenser 84.

*Horizontal deflection amplifier*

Figures 5, 9:
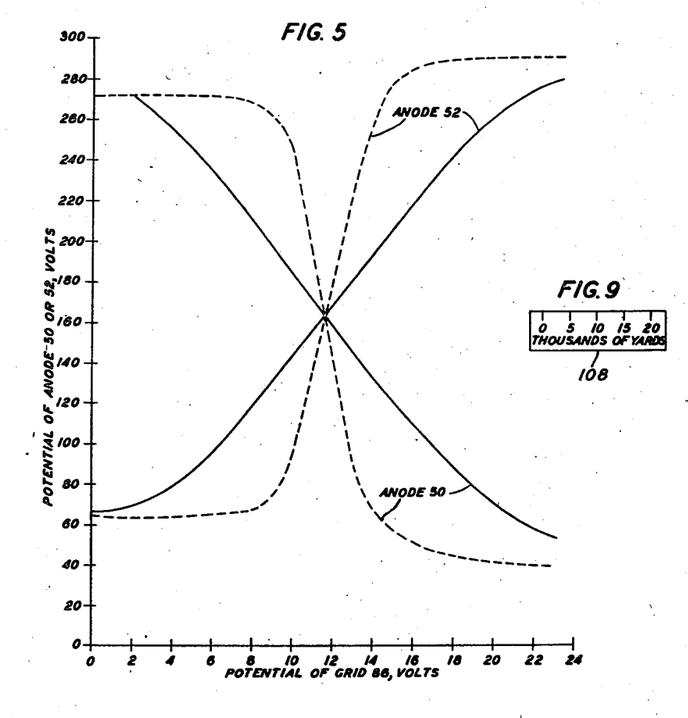
Fig. 5 is a graph of amplifier operating characteristics.
Fig. 9 shows an alternative form of a range scale which may be used in place of a scale shown in Fig. 8.

The tubes 48 and 49 operate as an inverter type direct current amplifier in known manner for delivering a balanced or push-pull output when excited from a single-sided or unbalanced source. The input is applied to the control grid of the tube 48, designated 86. The tube 49 has a corresponding control grid 87 which derives its voltage from a potentiometer 88, 89 comprising a pair of resistors 88 and 89 in the anode circuit of the tube 48. The anodes 50 and 52 of the tubes 48 and 49, respectively, are, as above-noted, connected to the plates 12 and 13, respectively, of the cathode-ray oscilloscope. The potentiometer 88, 89 corresponds in a general way to the potentiometer 18 of Fig. 1. The circuit constants of the amplifier tubes and the sensitivity of the cathode ray oscilloscope were adjusted in an illustrative embodiment of the invention which was built, so that a variation in the input potential on the grid 86 from approximately 4 volts to 20 volts positive (a total change of 16 volts) served to swing the cathode ray beam from left to right approximately 4½ inches across the face of the cathode-ray oscilloscope screen. The balanced voltage corresponding to the center index line of the cathode-ray screen was in this case approximately 12 volts. The solid line curves in Fig. 5 show the characteristic of the amplifier as thus described. It will be noted that the variation of the grid potential from 4 to 20 volts causes the anode 52 to rise in potential from approximately 80 volts to 260 volts while at the same time the anode 50 falls from approximately 250 volts to 80 volts. The characteristic curves are seen to cross at approximately 12 volts on grid 86.

The range mark 16 corresponds to a definite potential on the grid 86 of the deflection amplifier, 12 volts in the system that was built, and it is this voltage to which the potentials along the sweep are referred and with which they are, in effect, balanced. By using the push-pull type of amplifier it is possible to maintain the average potential of the deflection plates 12 and 13 at a constant value. As a result it is found that the sharpness of focus of the cathode ray is improved.

In the illustrative embodiment that was built, the range unit was designed for accurate measurement from 0 to 40,000 yards and for observation or approximate range measurement from 0 to 80,000 yards, the approximate measurements being made with the aid of a fixed scale on the screen of the oscilloscope. Such a scale is indicated at 94 on Fig. 8. The time constant of the resistance 21', 21'' and condenser 22', 22'' combination was so chosen that in 488 microseconds the potential across the condensers from start to stop rises approximately 16 volts, 488 microseconds being the time of travel of an electromagnetic wave to the object and return when the range of the object is 80,000 yards (163.91 yards per microsecond). The time constant of the start-stop circuit, condenser 78 and resistor 69 was adjusted accordingly.

The 16-volt rise in this embodiment is preferably only a small part of the total supply voltage, in this case made 300 volts. The time rate of change of condenser voltage during the sweep is accordingly practically constant providing a substantially linear time scale. The range measurement can then be effected by comparing the sweep voltage swing with a direct current reference voltage obtainable from a uniformly wound potentiometer.

With the potentiometer arm 23 set at the zero end of the scale, the potential on the grid 86 at the beginning of the sweep was designed to be approximately 12 volts, making the potential on the grid 86 at the end of the sweep 28 volts. Hence, the range trace at zero range starts at the center of the cathode ray screen and runs beyond the edge of the screen at the right.

For other settings of the potentiometer arm 23, the whole trace is moved to the left on the cathode-ray tube. At maximum range setting of potentiometer arm 23 the potential supplied to the grid 86 at the beginning of the rise in sweep votlage was designed to be +4 volts. In this position of the arm 23 the scale reading on the scale 24 is 40,000 yards, the range trace starts at the left side of the screen and crosses the center index line after a +8 volt rise corresponding to the 40,000 yards indicated. The full sweep corresponding to 80,000 yards covers the width of the screen during the +16 volt rise during the sweep. In other words, the scale 24 indicates the index-line ranges from 0 to 40,000 yards as the start of the trace moves from the center of the screen to the left-hand side by adjustment of the range potentiometer but when the arm 23 is set at maximum range of 40,000 yards, the trace observable upon the cathode-ray oscilloscope to the right of range mark 16 extends to 80,000 yards.

To promote precision of setting and accuracy of reading, the pointer 23' may be geared to the arm 23 in known manner so that the scale 24 may be greatly extended and divided as finely as desired. Precaution may be taken against error due to parallax between the range mark 16 and the cathode-ray trace by placing the range mark on the inside of the glass during manufacture.

The following tables show the values of the resistances and capacitances which were employed in the embodiment of Fig. 4 which was built:

| Element | Resistance, ohms |
|---|---|
| 19 | 700,000 |
| 20 | 20,000 |
| 21' | 10,000 |
| 21'' | 2,500 |
| 69 | 1,000,000 |
| 70 | 15,000 |
| 75 | 25,000 |
| 76 | 25,000 |
| 83 | 500,000 |
| 88 | 240,000 |
| 89 | 22,000 |
| 102 | 225 |
| 103 | 900 |
| 104 | 900 |
| 105 | 1,000 |
| 106 | 6,000 |
| 107 | 150,000 |
| 109 | 1,400,000 |
| 111 | 330 |
| 113 | 100,000 |
| 114 | 60,000 |
| 115 | 600 |
| 116 | 150 |
| 117 | 150 |
| 118 | 500 |
| 119 | 20,000 |
| 121 | 20,000 |
| 121 | 100 |

| Element | Capacitance, mf. |
|---|---|
| 22' | 0.01275 |
| 84 | 0.06 |
| 112 | 0.25 |
| 122 | 0.5 |
| 123 | 0.5 |

| Element | Capacitance, mmf. |
|---|---|
| 22'' | 100 |
| 73 | 20 |
| 77 | 50 |
| 78 | 130 |
| 79 | 500 |
| 85 | 15 |

Tube 31 was a 6J5; tubes 48 and 49 were 6AG7; and tube 60 was a 6SN7-GT. Battery sections 71 and 72 were each 150 volts.

Figure 6:
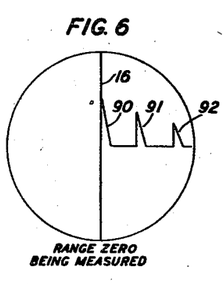
Figs. 6, 7 and 8 show illustrative patterns which may be observed on the screen of the oscilloscope in the system of Fig. 4.

Fig. 6 shows an ilustrative trace on the screen of the oscilloscope when the potentiometer arm 23' is set at range 0. A number of pulses are represented as being observable. The mark 90 represents an outgoing pulse which is being used to check the zero reading by observing the alignment of the mark 90 with the index 16. Other marks 91 and 92 represent received pulses from objects at various distances.

It will be evident at this point that range measurements near zero can be made without the necessity of using a preliminary pulse or "preknock" from the transmitter to start the sweep before the radio pulse is sent out. The start-stop and sweep circuits have been found, in practice, to operate rapidly enough so that the outgoing radio pulse appears at or after the beginning of the sweep. It is therefore feasible, if desired, to employ a spark transmitter, in which case no "pre-knock" is available.

Figure 7:
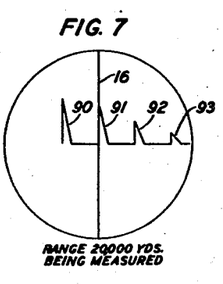

Fig. 7 shows the trace on the screen of the oscilloscope under the same conditions as were assumed for Fig. 6 except that the potentiometer arm 23' has been moved to indicate 20,000 yards on the scale 24. It is found that the mark 91 is now aligned with the range mark 16, indicating that the distant object from which the mark 91 was received has a range of 20,000 yards. The mark 92 and another mark 93 are observable to the right of the index 16.

Figure 8:
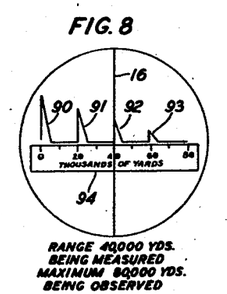

Fig. 8 shows the trace on the screen of the oscilloscope under the same conditions as were assumed for Figs. 6 and 7 except that the potentiometer arm 23' has been set for 40,000 yards and a fixed scale 94 has been placed adjacent to the screen. It is now found that the mark 92 is at the center of the screen, indicating that the object producing this mark is at a range of 40,000 yards. The scale 94 reveals that the marks 90, 91 and 93 represent ranges of 0, 20,000 and 60,000 yards respectively. In this case, the mark 92 is the only one for which an accurate measurement is being made, the others being observed upon the screen and measured approximately by the scale 94.

For simplicity, the scale 94 of Fig. 8 is shown as linear but in practice the scale will be somewhat non-linear, due principally to the amplifier characteristic, which is not linear over the entire input voltage range from 4 to 20 volts. The cathode ray does not move at a strictly constant speed across the screen except over the center portion where the amplifier characteristic is substantially linear. This fact, however, does not affect the linearity of the scale 24, since a measurement using that scale is always made at the voltage balance point, 12 volts in Fig. 5. The fixed scale 94 is to be calibrated to take care of the non-linearity of the amplifier characteristic.

In order to bring the beginning of the oscilloscope trace (outgoing pulse 56) to coincide with the range mark 16 when the scale 24 reads zero, the rheostat 21'' may be adjusted. A 2500-ohm rheostat has been used in this position with satisfactory results to line up the balance point of the amplifier with the range mark 16 without disturbing the time constant of the timing circuit appreciably. By virtue of this adjustment it has been found possible to use the same range mark for all measurements even though the amplifier tubes 48 and 49 may be replaced by others.

*Expanded sweep*

To facilitate range measurement and to observe the wave shape of echo pulses, provision has been made to magnify the scale of the horizontal trace in the oscilloscope at the center of the screen. This magnification is accomplished by increasing the voltage gain of the deflection amplifier while at the same time maintaining substantially 12 volts at the grid 86 as the null or balance point. In this way the calibration of the scale 24 is not affected. In practice, a magnification of four times is readily obtained and this value will be assumed in what follows.

Using the system as shown without the magnifying feature (commonly referred to as the main sweep), at the balance point, the instantaneous voltage on the grid 86 is equal to the voltage on the grid 87 (or vice versa), that is, 12 volts. Furthermore, if the tubes 48 and 49 are to provide balanced voltages to the deflecting plates of the oscilloscope, the voltage gain from the grid 86 to the anode 50 of the tube 48 must equal the voltage loss from the anode 50 to the grid 87 of the tube 49; namely, the voltage loss in the potentiometer 88, 89 which feeds the grid 87. Moreover, this condition must still pertain when the gain of the amplifier is increased for the purpose of magnifying the scale.

For operation using the magnified scale (commonly referred to as the expanded sweep), switches 100 and 101 are provided. The switch 100 when closed places a rheostat 102 in shunt connection across a pair of individual cathode feedback resistors 103 and 104 which normally connect the cathodes of the tubes 48 and 49 to ground through a resistor 115. The shunting effect of the rheostat 102 upon the resistors 103 and 104 reduces the amount of negative feedback in the tubes 48 and 49 with a resultant increase in voltage amplification. This change calls for an increase in loss in the potentiometer 88, 89 to offset the increase in gain. On the other hand, the grid 87 of the tube 49 must have a direct current potential of 12 volts to maintain the same balance point as on the main sweep. Closure of the switch 101 connects a potential divider comprising a rheostat 105 and resistors 106 and 107 to apply a portion of the supply voltage to the grid 87 to modify the potential on the grid 87. In this manner, the direct current potential of 12 volts on the grid 87 may be retained, while the alternating current voltage swing is reduced to compensate for the increased gain in the tube 48. The amplifier characteristic curves for the expanded sweep are shown by broken lines in Fig. 5.

To provide for a zero range adjustment of the expanded sweep, the rheostat 21" is first adjusted with the switches 100 and 101 open as for the main sweep so that the mark made by the outgoing pulse with scale 24 reading zero coincides with the index 16, as hereinbefore described. Then, the switches 100 and 101 are closed and the rheostat 105 is adjusted until the mark again coincides with the index 16, if, as will usually occur, the mark shifts slightly when the switches are closed. Thus the zero range adjustments for the main and expanded sweeps are independent of each other, except that the main sweep zero should be set before switching to the expanded sweep.

Since the gain of the deflection amplifier on the expanded sweep is increased by a certain factor compared with the main sweep and the balance point remains at the range mark 16, an enlarged scale (having one-fourth the range of the main sweep scale 94 where the amplification is increased by a factor of 4) may be provided. Such a scale is shown at 108 in Fig. 9 and may be used in place of the scale 94 in Fig. 8. To use the scale 108 in the system of Fig. 4, it is necessary to close the switches 100 and 101 and set the pointer 23' at 10,000 yards. The oscilloscope trace will then cover the range from 0 to 20,000 yards in approximately the same space on the cathode-ray screen as is covered by the 0 to 80,000 yard scale when using the main sweep.

It is not necessary, however, to use the scale 108 or any scale on the oscilloscope screen with the expanded sweep, as the latter feature may be used in the same manner as the main sweep by setting the mark of the received pulse to the index 16 and reading the corresponding value of the range from the scale 24. The precision of setting is increased in proportion to the increased sensitivity of the amplifier.

It is readily appreciated that if the values of any of the elements 19, 20, 21, or 22 making up the timing circuit should vary with temperature additional error will result. While the timing elements may be maintained at constant temperature by known means, it has been found simpler and more economical to compensate for temperature variations. It is only required that the direct current potential drop in the potentiometer in the quiescent state be matched against the rise in voltage when the condenser is being charged. From the foregoing requirement in the case where the voltage rise employed in the measurements is small compared to the supply voltage, and hence the voltage rise is substantially linear, it was found that a first order correction for the effect of temperature changes can be made by using a condenser having a temperature coefficient of capacity change which is equal to and of the sign opposite that of the temperature coefficient of resistance change of the potentiometer. In the embodiment that was built, the potentiometer had a positive temperature coefficient of approximately 150 parts in a million per degree centigrade, which was counterbalanced by a negative temperature coefficient of like amount for the condenser. The temperature coefficient of the condenser was adjusted by combining in proper proportion silver-mica condensers having a positive coefficient of about 15 parts per million per degree centigrade with a commercial make of ceramic condenser having a negative coefficient of about 600 parts per million.

Ordinary temperature variations in the large series resistor 19 are found not to appreciably affect the calibration of the scale 24 although they may necessitate a readjustment of the zero range setting of the rheostats 21" and 105.

What is claimed is:

1. A system for measuring recurrent substantially equal time intervals, said system comprising a potentiometer, means to maintain a substantially constant current through said potentiometer initially to establish a reference potential at a given point in the potentiometer, a condenser, means to switch the said current into said condenser at the start of each recurrent time interval, whereby the potentials of a plurality of points in the potentiometer are made to vary as a function of the time, means to select a point in said potentiometer the potential of which varies over a range including said reference potential, means to substantially discharge said condenser after the end of each time interval but before the start of the next, and means to compare the potential of the selected point in the potentiometer with the reference potential at the end of each said time interval, whereby the location of the point selected may be varied along the potentiometer until the change of potential of the selected point in the potentiometer during a time interval to be measured is substantially equal to the difference between the initial potential of the selected point and the reference potential.

2. A system for measuring recurrent substantially equal time intervals, said system comprising a source of electromotive force, a potentiometer and a condenser in series connection with said source of electromotive force, means recurrently effective to produce a substantially uniform and relatively low potential difference across said condenser at the start of each said time interval, means to select an intermediate point on said potentiometer, means to establish a reference potential of fixed value relative to the potential of said source of electromotive force, means to mark the start of each time interval to be measured by disabling the said means recurrently effective to maintain uniform the potential difference across said condenser, whereby the potentials of a plurality of points on said potentiometer are caused to vary as a function of time, means to mark the end of each said time interval to be measured, and an indicator for determining whether or not the potential of the selected intermediate point on said potentiometer is equal to the said established reference potential at the end of an interval to be measured, whereby the time required for the potential of the selected intermediate point on the potentiometer to reach the said reference potential may be adjusted to equal the time interval to be measured.

3. A system for measuring recurrent substantially equal time intervals, said system comprising a source of electromotive force, a conductive circuit including a potentiometer, said conductive circuit being connected between the terminals of said source of electromotive force, a condenser connected in shunt with a portion of said conductive circuit, means to select a point in said potentiometer the initial potential of which is used thereafter as a reference potential for comparison, means to open circuit the portion of said conductive circuit shunting said condenser recurrently at the instant of the start of each time interval to be measured, whereby the potentials of a plurality of points in the potentiometer are made to vary as a function of the time, means to close the said circuit to shunt said condenser after the end of each time interval but before the start of the next, means to select a second point in said potentiometer the potential of which varies over a range including said reference potential, and means to compare the said reference potential with the potential of the said second selected point in the potentiometer at the end of a time interval to be measured, whereby the change of potential of the second selected point during the interval to be measured may be made equal to the difference between the reference potential and the potential of the said second selected point at the start of the interval.

4. A system for measuring recurrent substantially equal time intervals the start of which is under the control of the measuring system, said system comprising a source of electromotive force, a conductive circuit including a potentiometer and a switching device for opening and closing the circuit, said conductive circuit being connected between the terminals of said source of electromotive force, a condenser connected in shunt relation to said switching device, means to determine a point in said potentiometer the potential of which when the conductive circuit is closed and the condenser is substantially discharged is used thereafter as a reference potential for comparison, means to actuate the said switching device to open the conductive circuit simultaneously with the start of each time interval to be measured, whereby the potentials of a plurality of points in the potentiometer are made to vary as a function of the time, means to actuate the said switching device to close the conductive circuit and substantially discharge the condenser after the end of each time interval but before the start of the next, means to select a second point in said potentiometer the potential of which varies over a range including said reference potential, and means to compare the said reference potential with the potential of the said second selected point in the potentiometer at the end of a time interval to be measured, whereby the change of potential of the second selected point during the interval to be measured may be made equal to the difference between the reference potential and the potential of the said second selected point at the start of the interval.

GEORGE HECHT.

REFERENCES CITED

The following references are of record in the file of this patent:

UNITED STATES PATENTS

| Number | Name | Date |
|---|---|---|
| 2,144,873 | Dimond | Jan. 24, 1939 |

FOREIGN PATENTS

| Number | Country | Date |
|---|---|---|
| 113,233 | Australia | June 2, 1941 |